US012572516B2

(12) United States Patent
Muthu et al.

(10) Patent No.: US 12,572,516 B2
(45) Date of Patent: Mar. 10, 2026

(54) DATA MODEL GENERATOR LEVERAGING A LANGUAGE MODEL

(71) Applicant: Intuit Inc., Mountain View, CA (US)

(72) Inventors: Malathy Muthu, Mountain View, CA (US); Raj Brij Srivastava, Mountain View, CA (US); Corinne Linda Finegan, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 10 days.

(21) Appl. No.: 18/651,655

(22) Filed: Apr. 30, 2024

(65) Prior Publication Data

US 2025/0335403 A1      Oct. 30, 2025

(51) Int. Cl.
*G06F 16/21* (2019.01)
*G06F 16/34* (2025.01)
*G06F 16/901* (2019.01)

(52) U.S. Cl.
CPC .......... *G06F 16/212* (2019.01); *G06F 16/345* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 12,008,332 | B1 * | 6/2024 | Gardner | G06F 16/345 |
| 12,074,895 | B1 * | 8/2024 | Shen | H04L 63/101 |
| 2018/0032497 | A1 * | 2/2018 | Mukherjee | G06F 40/253 |
| 2020/0020046 | A1 * | 1/2020 | Selvaraj | G06F 40/40 |
| 2025/0045256 | A1 * | 2/2025 | Gottlob | G06F 16/215 |
| 2025/0103797 | A1 * | 3/2025 | Wisoff | G06F 8/35 |

* cited by examiner

*Primary Examiner* — Umar Mian
(74) *Attorney, Agent, or Firm* — Lathrop GPM LLP

(57)      ABSTRACT

One or more embodiments provide for a method. The method includes applying, to a raw data structure defining a form, a data extraction controller to extract text from the raw data structure. The method also includes determining a text type of the text. The method also includes generating, according to the text type, a prompt for a language model to request enhanced information. The enhanced information includes information implicit in the form. The method also includes applying, with the prompt, the language model to the text to generate the enhanced information. The method also includes applying a data model generator to define a data model with a combination of the text and the enhanced information. The data model is a computer-readable representation of the form.

14 Claims, 8 Drawing Sheets

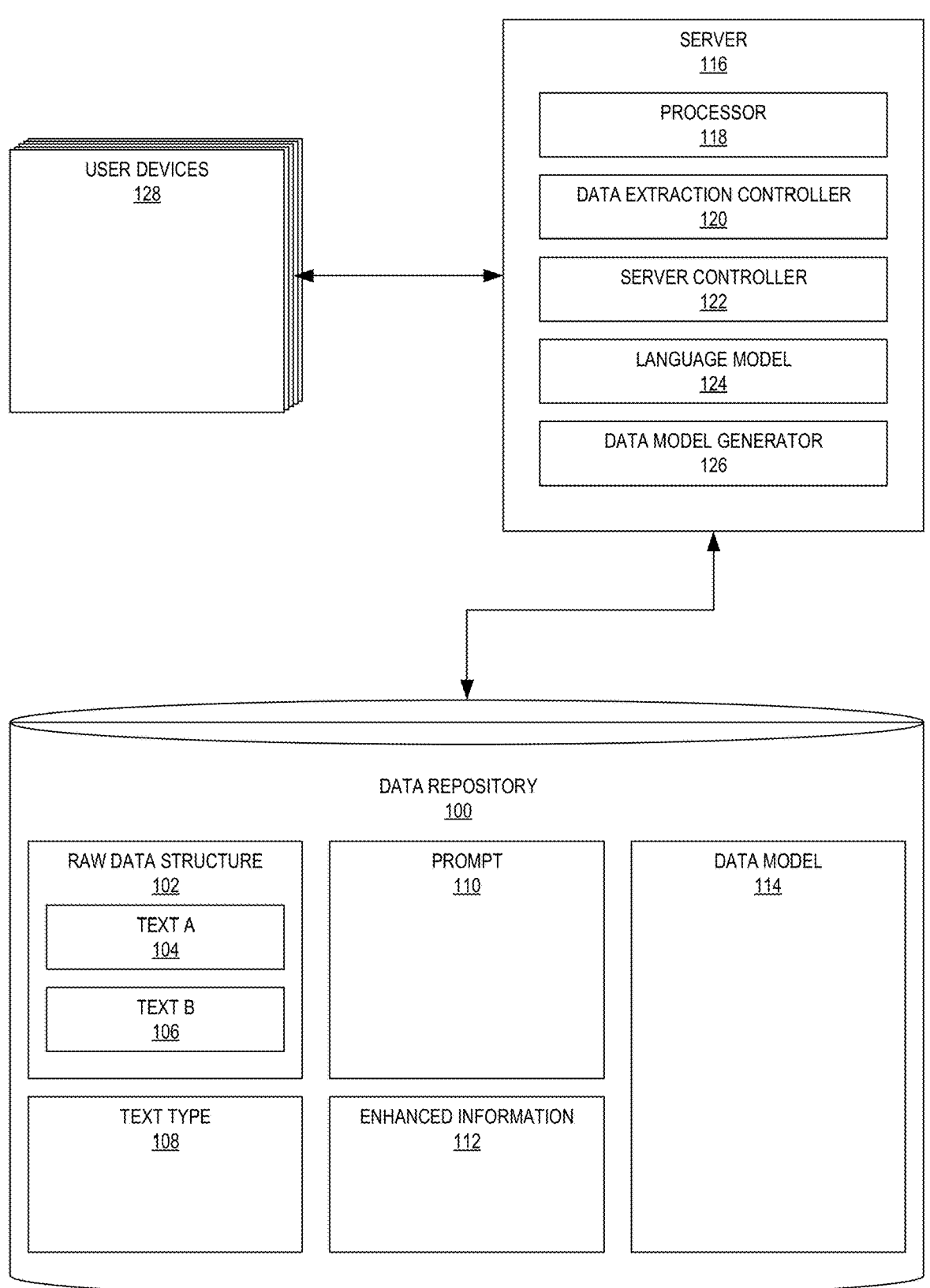
_FIG. 1_

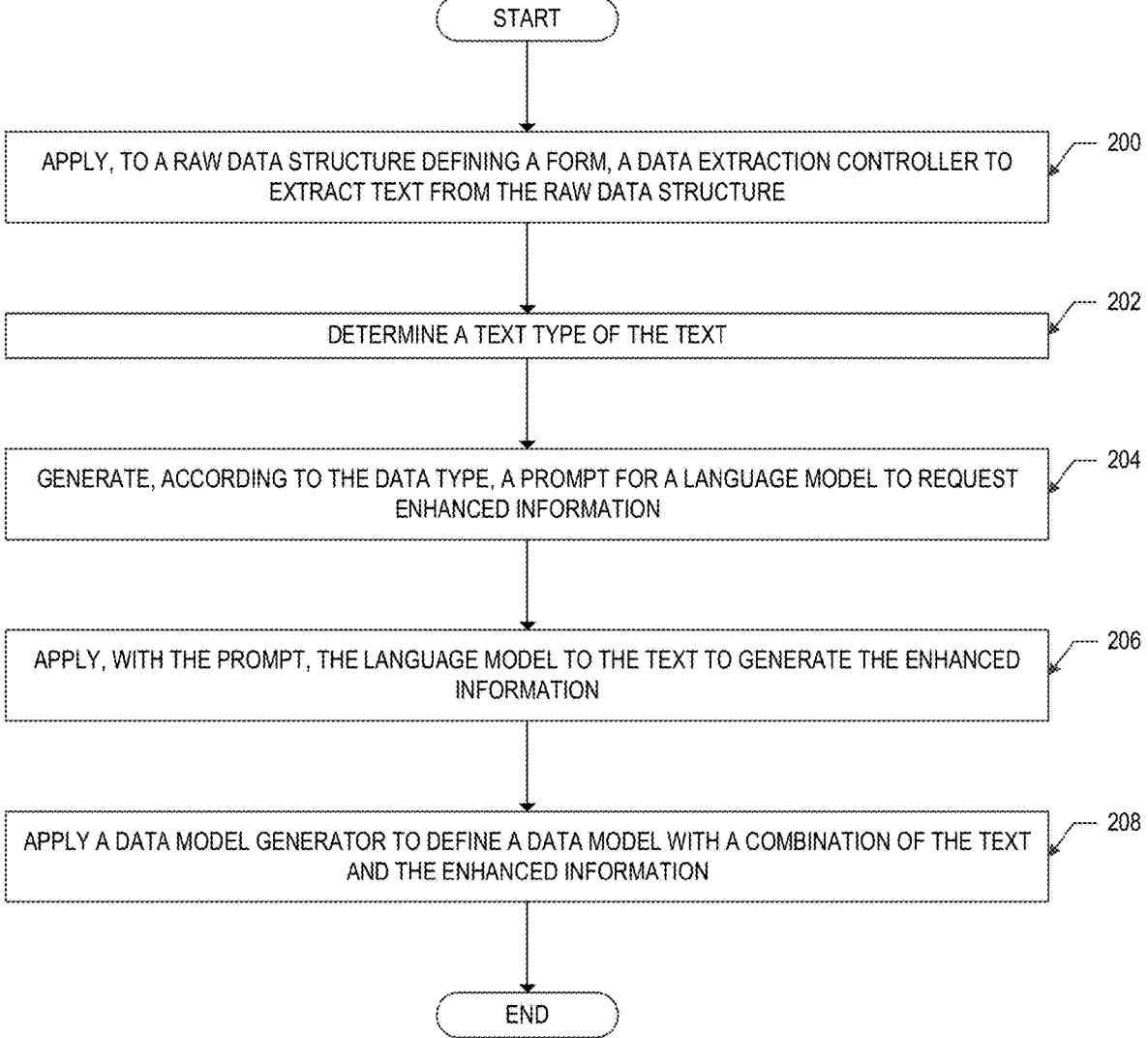

START

APPLY, TO A RAW DATA STRUCTURE DEFINING A FORM, A DATA EXTRACTION CONTROLLER TO EXTRACT TEXT FROM THE RAW DATA STRUCTURE — 200

DETERMINE A TEXT TYPE OF THE TEXT — 202

GENERATE, ACCORDING TO THE DATA TYPE, A PROMPT FOR A LANGUAGE MODEL TO REQUEST ENHANCED INFORMATION — 204

APPLY, WITH THE PROMPT, THE LANGUAGE MODEL TO THE TEXT TO GENERATE THE ENHANCED INFORMATION — 206

APPLY A DATA MODEL GENERATOR TO DEFINE A DATA MODEL WITH A COMBINATION OF THE TEXT AND THE ENHANCED INFORMATION — 208

END

220106CR19999

DR 0106CR (10/19/22)
COLORADO DEPARTMENT OF REVENUE
Tax.Colorado.gov
Page 1 of 3

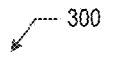

┌─── 302

2022 Colorado Pass-Through Entity Credit Schedule

| Organization Name | Colorado Account Number |
|---|---|
| ←——— 304 | |

Credit for Tax Paid to Another State by an S-Corporation

| | | | |
|---|---|---|---|
| 1. Name of other state ● 1 | | | |
| 2. Total income from sources in the other state ● 2 | | | 00 |

| | ● A. Tax Paid | ● B. Tax Allocated to Partners or Shareholders not included in this composite | ● C. Tax Allocated to Partners or Shareholders included in this composite |
|---|---|---|---|
| 3. Tax liability to other state ● 3 | 00 | 00 | 00 |

Non-refundable Credits

| | ● A. Credit Available | ● B. Credit Allocated to Partners or Shareholders not included in this composite. | ● C. Credit Allocated to Partners or Shareholders included in this composite |
|---|---|---|---|
| 4. New investment credit ● 4 | 00 | 00 | 00 |
| 5. Old investment tax credit ● 5 | 00 | 00 | 00 |
| 6. Carry forward of prior year Historic property preservation credit (per §39-22-514, C.R.S.) ● 6 | 00 | 00 | 00 |
| 7. Child care contribution credit, you must submit the DR 1317 with your return. ● 7 | 00 | 00 | 00 |
| 8. Child care center, family care home investment credit, you must submit a copy of your facility license and a list of depreciable tangible personal property with your return. ● 8 | 00 | 00 | 00 |
| 9. Employer child care investment credit, you must submit a copy of your facility license and a list of depreciable tangible personal property with your return ● 9 | 00 | 00 | 00 |
| 10. School-to-career investment credit, you must submit your certification letter with your return ● 10 | 00 | 00 | 00 |
| 11. Colorado works program credit, you must submit a copy of the letter from the county Department of Social/Human Services with your return. ● 11 | 00 | 00 | 00 |
| 12. Remediation of contaminated land credit, you must submit authorization from CDPHE with your return. ● 12 | 00 | 00 | 00 |

*FIG. 3*

Figure 5A:
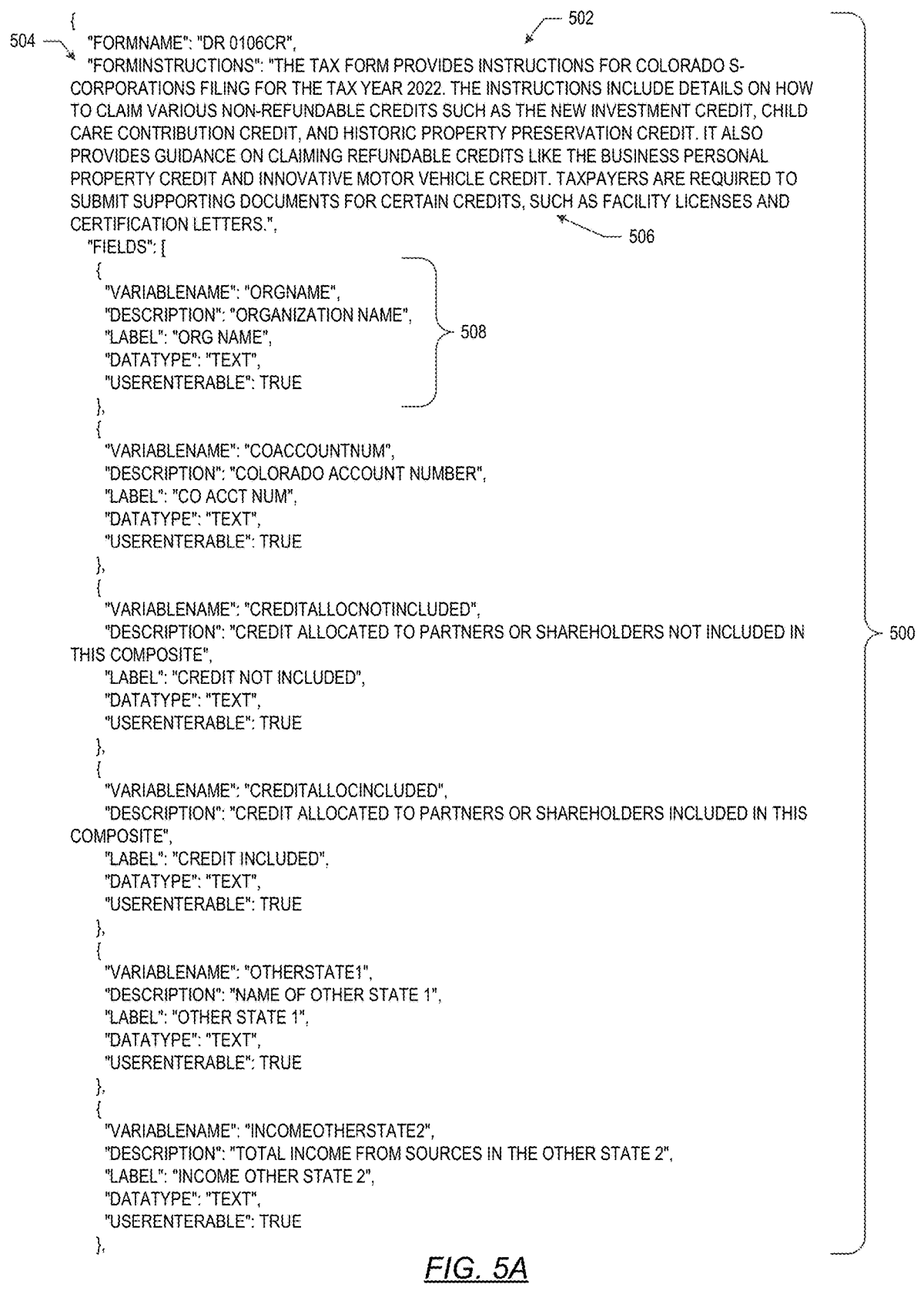

```
{
  "FORMNAME": "DR 0106CR",
  "FORMINSTRUCTIONS": "THE TAX FORM PROVIDES INSTRUCTIONS FOR COLORADO S-
CORPORATIONS FILING FOR THE TAX YEAR 2022. THE INSTRUCTIONS INCLUDE DETAILS ON HOW
TO CLAIM VARIOUS NON-REFUNDABLE CREDITS SUCH AS THE NEW INVESTMENT CREDIT, CHILD
CARE CONTRIBUTION CREDIT, AND HISTORIC PROPERTY PRESERVATION CREDIT. IT ALSO
PROVIDES GUIDANCE ON CLAIMING REFUNDABLE CREDITS LIKE THE BUSINESS PERSONAL
PROPERTY CREDIT AND INNOVATIVE MOTOR VEHICLE CREDIT. TAXPAYERS ARE REQUIRED TO
SUBMIT SUPPORTING DOCUMENTS FOR CERTAIN CREDITS, SUCH AS FACILITY LICENSES AND
CERTIFICATION LETTERS.",
  "FIELDS": [
    {
      "VARIABLENAME": "ORGNAME",
      "DESCRIPTION": "ORGANIZATION NAME",
      "LABEL": "ORG NAME",
      "DATATYPE": "TEXT",
      "USERENTERABLE": TRUE
    },
    {
      "VARIABLENAME": "COACCOUNTNUM",
      "DESCRIPTION": "COLORADO ACCOUNT NUMBER",
      "LABEL": "CO ACCT NUM",
      "DATATYPE": "TEXT",
      "USERENTERABLE": TRUE
    },
    {
      "VARIABLENAME": "CREDITALLOCNOTINCLUDED",
      "DESCRIPTION": "CREDIT ALLOCATED TO PARTNERS OR SHAREHOLDERS NOT INCLUDED IN
THIS COMPOSITE",
      "LABEL": "CREDIT NOT INCLUDED",
      "DATATYPE": "TEXT",
      "USERENTERABLE": TRUE
    },
    {
      "VARIABLENAME": "CREDITALLOCINCLUDED",
      "DESCRIPTION": "CREDIT ALLOCATED TO PARTNERS OR SHAREHOLDERS INCLUDED IN THIS
COMPOSITE",
      "LABEL": "CREDIT INCLUDED",
      "DATATYPE": "TEXT",
      "USERENTERABLE": TRUE
    },
    {
      "VARIABLENAME": "OTHERSTATE1",
      "DESCRIPTION": "NAME OF OTHER STATE 1",
      "LABEL": "OTHER STATE 1",
      "DATATYPE": "TEXT",
      "USERENTERABLE": TRUE
    },
    {
      "VARIABLENAME": "INCOMEOTHERSTATE2",
      "DESCRIPTION": "TOTAL INCOME FROM SOURCES IN THE OTHER STATE 2",
      "LABEL": "INCOME OTHER STATE 2",
      "DATATYPE": "TEXT",
      "USERENTERABLE": TRUE
    },
```

```
{
  "TABLENAME": "TABLE1",
  "TABLEDESCRIPTION": "TABLE 1: ORGANIZATION NAME AND COLORADO ACCOUNT
NUMBER",
  "NUMBEROFROWS": 1,
  "TABLE": [
    {
      "VARIABLENAME": "ORGNAME",
      "DESCRIPTION": "ORGANIZATION NAME",
      "LABEL": "ORG NAME",
      "DATATYPE": "TEXT",
      "ROWORCOLUMN": "COLUMN"
    },
    {
      "VARIABLENAME": "COACCOUNTNUM",
      "DESCRIPTION": "COLORADO ACCOUNT NUMBER",
      "LABEL": "CO ACCT NUM",
      "DATATYPE": "TEXT",
      "ROWORCOLUMN": "COLUMN"
    }
  ]
},
{
  "TABLENAME": "TABLE2",
  "TABLEDESCRIPTION": "TABLE 2: TAX PAID AND TAX ALLOCATED TO PARTNERS OR
SHAREHOLDERS",
  "NUMBEROFROWS": 1,
  "TABLE": [
    {
      "VARIABLENAME": "TAXPAID",
      "DESCRIPTION": "A. TAX PAID",
      "LABEL": "TAX PAID",
      "DATATYPE": "FLOAT",
      "ROWORCOLUMN": "COLUMN"
    },
    {
      "VARIABLENAME": "TAXALLOCNOTINCLUDED",
      "DESCRIPTION": "B. TAX ALLOCATED TO PARTNERS OR SHAREHOLDERS NOT INCLUDED
IN THIS COMPOSITE",
      "LABEL": "TAX NOT INCLUDED",
      "DATATYPE": "TEXT",
      "ROWORCOLUMN": "COLUMN"
    },
    {
      "VARIABLENAME": "TAXALLOCINCLUDED",
      "DESCRIPTION": "C. TAX ALLOCATED TO PARTNERS OR SHAREHOLDERS INCLUDED IN
THIS COMPOSITE",
      "LABEL": "TAX INCLUDED",
      "DATATYPE": "TEXT",
      "ROWORCOLUMN": "COLUMN"
    },
```

{
    "VARIABLENAME": "INNOVATIVEVEHICLECREDIT",
    "DESCRIPTION": "29. INNOVATIVE MOTOR VEHICLE AND INNOVATIVE TRUCK CREDIT FROM
FORM DR 0617, YOU MUST SUBMIT THE DR 0617(S) WITH YOUR RETURN",
    "LABEL": "INNOVATIVE VEHICLE CREDIT",
    "DATATYPE": "FLOAT",
    "USERENTERABLE": TRUE,
    "ROWORCOLUMN": "ROW"
},
{
    "VARIABLENAME": "REFUNDABLEZONECREDITS",
    "DESCRIPTION": "30. REFUNDABLE ENTERPRISE ZONE CREDITS FROM THE DR 1366 LINE 86,
YOU MUST SUBMIT THE DR 1366 WITH YOUR RETURN",
    "LABEL": "REFUNDABLE ZONE CREDITS",
    "DATATYPE": "FLOAT",
    "USERENTERABLE": TRUE,
    "ROWORCOLUMN": "ROW"
},
{
    "VARIABLENAME": "CONVERSIONCOSTSCREDIT",
    "DESCRIPTION": "31. CREDIT FOR CONVERSION COSTS TO AN EMPLOYEE-OWNED
BUSINESS MODEL. YOU MUST SUBMIT THE CERTIFICATE FROM THE OFFICE OF ECONOMIC
DEVELOPMENT WITH YOUR RETURN",
    "LABEL": "CONVERSION COSTS CREDIT",
    "DATATYPE": "FLOAT",
    "USERENTERABLE": TRUE,
    "ROWORCOLUMN": "ROW"
},
{
    "VARIABLENAME": "PASSTHROUGHCREDIT",
    "DESCRIPTION": "32. ELECTING PASS-THROUGH ENTITY OWNER TAX CREDIT (SEE
INSTRUCTIONS)",
    "LABEL": "PASS THROUGH CREDIT",
    "DATATYPE": "FLOAT",
    "USERENTERABLE": TRUE,
    "ROWORCOLUMN": "ROW"
},
{
    "VARIABLENAME": "TOTALREFUNDCREDITS",
    "DESCRIPTION": "33. TOTAL REFUNDABLE CREDITS, SUM OF LINES 28 THROUGH 32. ENTER
HERE AND TRANSFER THE AMOUNT IN COLUMN C TO LINE 16 ON THE DR 0106 COMPOSITE
RETURN",
    "LABEL": "TOTAL REFUND CREDITS",
    "DATATYPE": "FLOAT",
    "USERENTERABLE": TRUE,
    "ROWORCOLUMN": "ROW"
    }
  ]
 }
]
}
```

DATA MODEL GENERATOR LEVERAGING A LANGUAGE MODEL

BACKGROUND

Rendering forms into computer-usable data models can be a difficult task. For example, while a screen scraping application can extract text from a form, the structure of the form (e.g., the placement pictures, tables, and relationships of text) may not be captured. Furthermore, the text obtained is raw text, and thus may not be in a format readily transformable into a specific type of data structure. Yet further, a summary of the form is not available, which may increase the difficulty of working with the raw text. Thus, methods and systems are sought for generating one or more different data models that describe a form originally stored as a raw data structure.

SUMMARY

One or more embodiments provide for a method. The method includes applying, to a raw data structure defining a form, a data extraction controller to extract text from the raw data structure. The method also includes determining a text type of the text. The method also includes generating, according to the text type, a prompt for a language model to request enhanced information. The enhanced information includes information implicit in the form. The method also includes applying, with the prompt, the language model to the text to generate the enhanced information. The method also includes applying a data model generator to define a data model with a combination of the text and the enhanced information. The data model is a computer-readable representation of the form.

One or more embodiments also provide for a system. The system includes a processor. The system also includes a data repository in communication with the processor and storing a raw data structure defining a form. The data repository also stores text extracted from the raw data structure and a text type of the text. The data repository also stores a prompt including instructions to request enhanced information. The enhanced information includes information implicit in the form. The data repository also stores a data model being a computer-readable representation of the form. The system also includes a data extraction controller programmed, when executed by the processor, to extract the text from the raw data structure. The system also includes a server controller programmed, when executed by the processor to generate, according to the text type, the prompt. The system also includes a language model programmed at least by the prompt, when executed by the processor, to generate the enhanced information. The system also includes a data model generator programmed, when executed by the processor, to define the data model with a combination of the text and the enhanced information.

One or more embodiments provide for another method. The method includes applying, to a raw data structure defining a form, a data extraction controller to extract text from the raw data structure. The form includes a combination of form text, a field, and a formula. The text includes the form text, a first summary of the form text, a first definition of the field, and a second definition of the formula. The method also includes determining text types of the text. The method also includes generating, according to the text types, prompts for a language model to request enhanced information. A different prompt of the prompts is defined for each of the text types. The enhanced information includes information implicit in the form. The enhanced information is selected from the group consisting of: a second summary of form instructions, a rule applied to a key-value pair defining an entry on the form, a substituted text type for a table variable that has an unknown text type, a description of a field of the form, a formula defined by words on the form, and a combination thereof. The method also includes applying, with the prompts, the language model to the text to generate the enhanced information. The method also includes applying a data model generator to define a data model with a combination of the text and the enhanced information. The data model is a computer-readable representation of the form. Applying the data model generator further includes establishing a relationship between at least one of: first instances of the text, the text and the enhanced information, and second instances of the enhanced information.

Other aspects of one or more embodiments will be apparent from the following description and the appended claims.

BRIEF DESCRIPTION OF DRAWINGS

FIG. 1 shows a computing system, in accordance with one or more embodiments.

FIG. 2 shows a flowchart of a method for generating a data model by leveraging a language model, in accordance with one or more embodiments.

FIG. 3, FIG. 4, FIG. 5A, FIG. 5B, and FIG. 5C show an example of a data model generator leveraging a language model to generate a data model from a form, in accordance with one or more embodiments.

Like elements in the various figures are denoted by like reference numerals for consistency.

DETAILED DESCRIPTION

One or more embodiments are directed to a data model generator that leverages a language model to generate a data model from a form. Text is extracted from the raw data structure that defines the initial computer-readable version of the form. One or more text types of the extracted text are then identified. For example, a portion of the extracted text may be raw text, another portion of the extracted text may be key-value pairs that define form inputs, and yet another portion of the extracted text may be comma separated values that define the structure of one or more tables in the form. In this example, each of the raw text, the key-value pairs, and the comma separated values represents one of three different text types present in the raw text extracted from the form.

Figure 4:
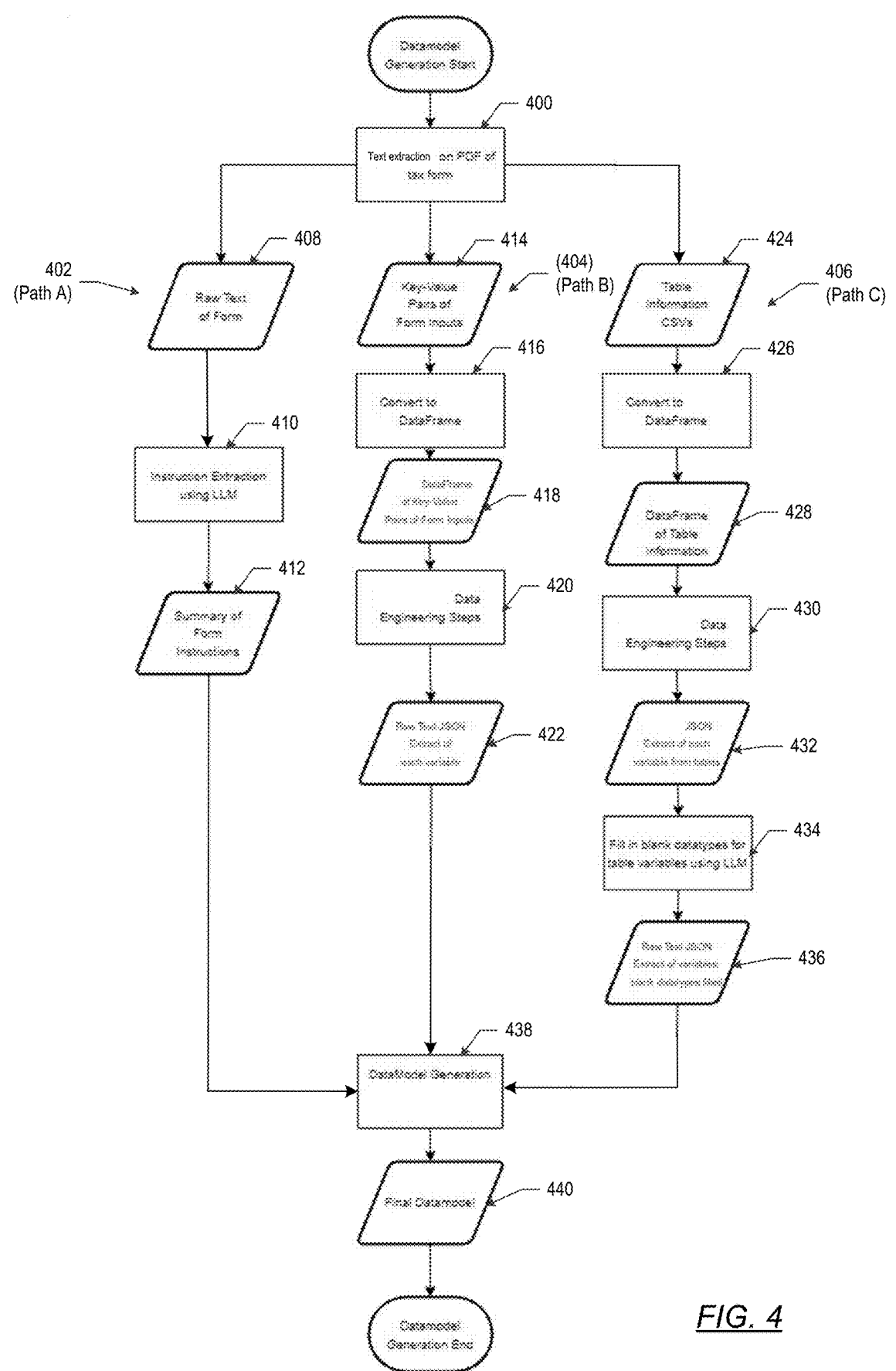

The raw text is then processed according to the text types, possibly using a language model (e.g., a large language model, such as CHAT GPT®). For example, as shown in FIG. 4, a prompt may be generated for each set of raw text associated with a given text type. The prompt for the raw text instructs the language model to summarize the raw text (e.g., to summarize sets of instructions on the form into summarized sets of instructions). Then, rules may be applied to key-value pairs to convert the text into an object notation language file (e.g., a JSON (JAVASCRIPT® object notation file). Another prompt is generated for the comma separated values. The prompt for the comma separated values instructs the language model to fill in field text types for table variables in the table defined by the comma separated values. Other types of text types and corresponding prompts may exist.

After processing the various text types, the output of processing each subset of the text is in a desired data model format. In the example above, the output of processing the three text types may be converted into a desired data model, such as but not limited to a JSON file or other object notation language file.

The resulting data model is then stored or used for other processing. For example, the data model is available for programmers who may desire to build software for completing the form automatically. Because the data model is available in a standard format and contains enhanced information (e.g., summaries, filled-in text types, formatting information, etc.) a programmer may find building the software to be an easier project. In another example, the data model may be passed to some other application, which takes the data model as input.

Other examples are possible. Thus, the examples provided above do not necessarily limit other embodiments described herein.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a raw data structure (102). The raw data structure (102) is a computer-readable data structure that defines a form. For example, the raw data structure (102) may be a portable document file (PDF) file. The raw data structure (102) also may be a word processing document, an image file, a spreadsheet file, an object notation file, or other types of files that store information that may be displayed or processed as a form. An example of the form is shown in FIG. 3.

The raw data structure (102) contains text or images of text, such as text A (104) or text B (106). Each set of text (i.e., the text A (104) or the text B (106)) may be a string of alphanumeric or special characters. In the case that the raw data structure (102) is an image of text, the raw data structure (102) is stored in a format that defines pixels for the image. Thus, the text is stored in the as pixels that, when viewed together as a whole, forms an image of the text.

In an example, the form may show one or more of form text, a field, a formula, an image, or combinations thereof. In this case, the text may be the form text, a summary of the form text, a definition of the field, and a definition of the formula, or combinations thereof.

The data repository (100) also stores a text type (108). The text type (108) is a type of text in the raw data structure (102). The raw data structure (102) may contain multiple text types. Thus, the text A (104) may be one text type and the text B (106) may be a second, different text type. Accordingly, the text type (108) may be one or more text types, such as but not limited to: instruction text describing instructions on the form, raw text in the form, image text (i.e., an image which when the pixels of the image are viewed together may be viewed as text), key-value pairs of form inputs present on the form (e.g., fields on the form paired with instructions adjacent the fields, or a field identifier paired with a field location), one or more comma separated values (CSV) that define a structure of the form (e.g., one or more tables in the form, or the placement of lines, text, images, etc.), formulae present in the form, and combinations thereof.

The data repository (100) also stores a prompt (110). The prompt (110) is an instruction, written in natural language text, that serves as input to a language model (124), defined below. More specifically, the prompt (110) includes instructions to request enhanced information (112), defined below.

The prompt (110) also may include additional instructions, such as a system message. A system message provides general instructions to the language model which constrain the model's application of other aspects of the prompt (110).

The prompt (110) also may include one or more sets of instructions particular to a text type. In an embodiment, each text type may have a corresponding distinct set of instructions in the prompt (110) that are particular to the text type. In another embodiment, one or more text types may have multiple corresponding distinct sets of instructions in the prompt (110).

For example, the prompt may be an instruction to summarize the text in the raw data structure (102). In another example, the prompt may be an instruction to define a rule that applies to a key-value pair defining an entry on the form. In another example, the prompt may be an instruction to identify a text type for a table variable defined on the form. In another example, the prompt may be an instruction to define a rule that applies to a key-value pair. In another example, the prompt may be an instruction to identify a text type for a table variable in the form. In another example, the prompt may be an instruction to the language model to suggest a suggested text type for a table variable having an unknown text type. In another example, the prompt may be an instruction to determine a rule for an entry on the form. Many other examples are possible.

The data repository (100) also may store enhanced information (112). The enhanced information (112) is information implicit in the form. Information implicit in the form is defined as content in the form or metadata applied to the form in some manner (e.g., metadata associated with the form in general, or metadata associated with some portion of the form). Examples of implicit information include, but are not limited to, a mathematical formula defined in words on the form; a summary of form instructions; a rule applied to a key-value pair defining an entry on the form; a substituted text type for a table variable that has an unknown text type; a description of a field of the form; a formula defined by words on the form; a description of the structure of the form as expressed using text; and combinations thereof.

In general, the enhanced information (112) is information output by the language model (124) in response to application of the language model (124) to the prompt (110). Thus, the enhanced information (112) may include multiple sets of enhanced information. Each set of enhanced information may be defined for one or more of the text types described above.

The data repository (100) also stores a data model (114). The data model (114) is a computer-readable representation of the form. For example, the data model (114) may be an object notation data structure (e.g., a JSON file), but may take different forms. For example, the data model (114) may be a relational data model (e.g., a set of tuples that are a member of a data domain, with each set of tuples containing attributes), a graph data model, a column data model such as a wide-column data model, a text search data model, and others. The prompt (110), together with other rules and processes described with respect to FIG. 3 or FIG. 4, are used to define the nature of the data model (114).

The system shown in FIG. 1 may include other components. For example, the system shown in FIG. 1 also may include a server (116). The server (116) is one or more computer processors, data repositories, communication devices, and supporting hardware and software. The server (116) may be in a distributed computing environment. The server (116) is configured to execute one or more applications, such as the data extraction controller (120), server controller (122), language model (124), and data model generator (126), defined below. An example of a computer system and network that may operate as the server (116) is described with respect to FIG. 6A and FIG. 6B.

The server (116) includes a computer processor (118). The computer processor (118) is one or more hardware or virtual processors which may execute computer readable program code that defines one or more applications, such as the data extraction controller (120), server controller (122), language model (124), and data model generator (126), defined below. An example of the computer processor (118) is described with respect to the computer processor(s) (602) of FIG. 6A.

The server (116) also includes a data extraction controller (120). The data extraction controller (120) is software or application specific hardware programmed, when executed by the processor, to extract the text (e.g., the text A (104) or the text B (106)) from the raw data structure (102). Examples of the data extraction controller (120) may include one or more of a screen scraper, an optical character recognition application, a text extraction application such as but not limited to TEXTRACT®, and others.

The server (116) also includes a server controller (122). The server controller (122) is software or application specific hardware programmed, when executed by the processor, generates the prompt (110) according to the text type. For example, the server controller (122) may be software that is programmed to automatically identify the text type, and to select a specific prompt instruction for that text type from a library of prompt instructions.

The server (116) also includes a language model (124). The language model (124) is a natural language processing machine learning model. An example of the language model (124) may be a large language model, such as CHATGPT®. However, many different language models may be used. In general, the language model (124) is executed using at least the instructions provided by the prompt (110) in order to generate the enhanced information. Use of the language model (124) is described with respect to FIG. 2.

The server (116) also includes a data model generator (126). The data model generator (126) is software or application specific hardware programmed, when executed by the processor, to define the data model (114) with a combination of the text and the enhanced information. In general, the data model generator (126) applies rules to the text and the enhanced information in order to generate the data model (114). More specific operations of the data model generator (126) are described with respect to FIG. 2.

The system in FIG. 1 also may include one or more user devices (128). The user devices (128) need not be part of the system of FIG. 1 (i.e., the user devices (128) may be remote user devices). For example, the user devices (128) permit a user (e.g., a computer scientist or technician) to access the server (116) in order to initiate generation of the data model (114). The user devices (128) also may be used to modify or generate the prompt (110).

While FIG. 1 shows a configuration of components, other configurations may be used without departing from the scope of one or more embodiments. For example, various components may be combined to create a single component.

As another example, the functionality performed by a single component may be performed by two or more components.

FIG. 2 shows a flowchart of a method for generating a data model by leveraging a language model, in accordance with one or more embodiments. The method of FIG. 2 may be implemented using the system of FIG. 1.

Step 200 includes applying, to a raw data structure defining a form, a data extraction controller to extract text from the raw data structure. The process of extracting text from the raw data structure may depend on the type of extraction application that is applied to the form.

For example, if the raw data structure is an image, then extracting the text may be performed by executing a screen scraper to identify text from the image. In another example, if the raw data structure is a PDF file, then extracting the text may be performed by executing a PDF application to convert the PDF file into a text searchable form, and then extracting the text. In still another example, if the raw data structure is a text file, then extracting the text may be performed by using a word processing application to extract the text into a format suitable for further processing as described below. In yet another example, if the raw data structure is an object notation file (e.g., a JSON file), then extracting the text may be performed by applying an object notation file reader to the file and extracting the text therein into a format suitable for further processing as described below. Many other examples are possible.

Step 202 includes determining a text type of the text. Determining the text type may be performed according to a number of different methods, which may be used alone or together. For example, determining the text type may include identifying the text as being at least one of: plain text, a key-value pair associated with a field of the form, or table information defining a structure of a table within the form.

More specifically, the text type may be determined using a library that defines text types for different texts. For example, if the text has a certain format or certain text strings, then the format or certain text strings are compared to the library. A corresponding text type defined for the format or certain text strings is returned from the library. The text type returned is then associated with (i.e., corresponds to) the instance of text.

In another example, the text type may be determined using a language model. While the language model is used in step 206 below, the language model also may be used in step 202 to determine the text type. For example, a prompt may be retrieved from a library of prompts, or a prompt may be generated by a user. The prompt may be, for example, "please identify the text type of each instance of text in the following named file." The language model is then applied to the prompt. The output of the language model may be the text type associated with an instance of text (or multiple text types associated with multiple text types, on a one-to-one basis).

The text type may be one or more of the text types described with respect to FIG. 1. For example, determining the text type at step 202 may include identifying the text as being at least one of: plain text, a key-value pair associated with a field of the form, a table information defining a structure of a table within the form, or combinations thereof. Many other examples are possible.

Step 204 includes generating, according to the text type, a prompt for a language model to request enhanced information. Again, as defined in FIG. 1, the enhanced information is information implicit in the form.

The prompt may be generated by retrieving the prompt from a library of prompts. Specifically, each different text type may have one or more prompts defined in the library. Thus, once the text type is identified, then the corresponding prompt or prompts may be retrieved from the library of prompts.

The prompt also may be generated by a user. For example, a computer scientist could generate the prompt or prompts after reviewing the identified text types.

The prompt also may be generated by the language model. For example, a different prompt may instruct the language model to suggest an instruction to be made to the model to generate the desired results of the prompt.

The prompt also may be generated by a set of rules or policies that modify or combine one or more prompts defined in the library of prompts. Thus, the prompt is not necessarily limited to a specific set of prompts for a given text type. For example, the presence of some other text type in the text may cause the rules or policies to output a prompt for a given text type that is different than what the rules or policies otherwise would have output.

For example, assume that normally prompt A corresponds to text type A, and prompt B corresponds to text type B. A policy may be set such that when an instance of text type C is present and an instance of text type A are in the extracted text, then instead prompt B is assigned to text type A. Other variations are possible.

Step 206 includes applying, with the prompt, the language model to the text to generate the enhanced information. Specifically, the prompt contains the instructions described above. The extracted text (e.g., text extracted at Step 202) is either added to the prompt or is referenced in the prompt (e.g., the prompt instructs the language model to access a file which contains some or all the extracted text). The language model then executes, according to the instructions defined in the prompt, on the extracted text.

The language model outputs output text, which may be characterized as multiple instances of output text. Each instance of output text is associated with one or more of the instances of the text types. The output text includes the enhanced information. For example, if the text type is raw text, then the output text may be a summary of the raw text (i.e., the enhanced information in this case is the summary). Specific examples of the output text are shown in FIG. 4.

Step 208 includes applying a data model generator to define a data model with a combination of the text and the enhanced information. How the model generator combines the text with the enhanced information depends on the nature of the data model. For example, if the data model is an object notation file (e.g., a JSON file), then the model generator may associate instances of the text and corresponding instances of the enhanced information as key-value pairs. The key-value pairs are then expressed in the object notation language (e.g., JAVASCRIPT®).

In another example, the model generator may convert the text into a graph database or graph data structure. The text may serve as nodes of the graph data structure and the structure of the form may be expressed as edges of the graph data structure. The enhanced information may be expressed as metadata associated with the nodes, edges, or both the nodes and edges.

The model generator may perform other actions, such as converting the text into another data format, such as a vector. Applying the data model generator also may include establishing a relationship between at least one of: a first set of instances of the text, the text and the enhanced information, or a second set of instances of the enhanced information. A specific example of the operation of the model generator is shown with respect to FIG. 4.

The method of FIG. 2 may be varied. For example, one or more embodiments contemplate applying, to a raw data structure defining a form, a data extraction controller to extract text from the raw data structure. In this variation method, the form includes a combination of form text, a field, and a formula. The text includes the form text, a first summary of the form text, a first definition of the field, and a second definition of the formula. The variation method also includes determining multiple text types of the text. The variation method also includes generating, according to the multiple text types, multiple prompts for a language model to request enhanced information. A different prompt of the multiple prompts is defined for each of the multiple text types. The enhanced information includes information implicit in the form. The enhanced information is selected from: a second summary of form instructions, a rule applied to a key-value pair defining an entry on the form, a substituted text type for a table variable that has a field text type, a description of a field of the form, a formula defined by words on the form, or a combination thereof.

The variation method also includes applying, with the multiple prompts, the language model to the text to generate the enhanced information, as described with respect to step 206. The variation method also includes applying a data model generator to define a data model with a combination of the text and the enhanced information, wherein the data model is a computer-readable representation of the form, as described with respect to step 208. Applying the data model generator further includes establishing a relationship between at least one of: a first multiple instances of the text, the text and the enhanced information, or a second multiple instances of the enhanced information. Still other variations are possible.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3, FIG. 4, FIG. 5A, FIG. 5B, and FIG. 5C show an example of a data model generator leveraging a language model to generate a data model from a form, in accordance with one or more embodiments. In particular, the example starts with form (300) shown in FIG. 3. The form (300) is form DR0106CR promulgated by the State of Colorado of the United States of America. The form (300) is meant for processing a 2022 Colorado pass-through entity credit schedule. In other words, the form (300) is a tax form used when preparing a tax return in the State of Colorado. Initially, the form (300) is stored in a portable document format (PDF) computer-readable data structure. The form (300), among many other key-values shown on the form (300), includes a "organization name" key (302), and a corresponding field (304) that permits a user to enter the organization name on the form (300).

A software development company desires to convert the form (300) into a data model. Programmers at the software development company may use such a data model during development or modification of software that automatically processes an end user's taxes in the State of Colorado. In addition, the programmers prefer to have a library of data models, where each data model represents a different tax form. The data model that defines the form (300) in a computer-readable format permits the software under development to call or retrieve a standardized data model, thereby reducing the development time and cost of the software.

A variation of the method of FIG. 2 (i.e., the method of FIG. 4) may use the system of FIG. 1 to process the form (300). Specifically, the method of FIG. 4 describes how to leverage a large language model to generate the data model that describes the form (300). The method of FIG. 4 not only captures the text shown on the form (e.g., the text instructions and implicit formula shown at line 6 of the form (300)), but also the structure of the form (300). For example, the method of FIG. 4 captures the table structure of the form, including the three columns of fields in which financial data is entered when processing an end user's Colorado taxes.

Attention is now turned to FIG. 4, which is a variation of the method of FIG. 2, as applied to the form (300) shown in FIG. 3. A determination is made that the form (300) contains table information. Thus, the process splits along three different paths, each of which may be performed concurrently in parallel, serially, or in some combination of concurrently and serially. The path A (402) is taken to process raw text on the form (300). The path B (404) is taken to process key-value pairs of text to describe the type of information to be placed in fields on the form (300). The path C (406) is taken to determine comma separated values (CSVs) that define the table structure of the form (300).

Each of the three paths may be an execution of the method of FIG. 2 with respect to a given text type. Specifically, the path A (402) represents the method of FIG. 2 taken with respect to the raw text of the form (i.e., a raw text type). The path B (404) represents the method of FIG. 2 taken with respect to key-value pairs of the form (i.e., a key-value pair text type). The path C (406) represents the method of FIG. 2 taken with respect to CSVs of the form (i.e., a CSV text type).

The three paths begin at a text extraction step. Specifically, at step 400 a text extraction software application is applied to the PDF data structure (i.e., the raw data structure) to extract text from the form (300). Again, the text extracted at step 400 includes three different text types that are identified during the text extraction process at step 400. The three different text types are, again, the raw text in the form (300), key-value pairs in the form (e.g., form (300)), and CSVs in the form (300). Again, further processing of the text varies depending on the text type, hence leading to the three paths (path A (402) for the raw text type, path B (404) for the key-value pairs text type, and path C (406) for the CSVs text type) as described further below.

Attention is first turned to the path A (402). Step 408 includes storing the raw text extracted at step 400 in the form (300) as a text string, or a set of text strings where each set of text strings represents text taken from a section of the form (300).

Step 410 includes instruction extraction using a large language model. A prompt is generated that instructs the large language model to analyze tax form instructions from the raw text of the form (300). The prompt also instructs the large language model to generate a summary of the form (300) instructions.

At step 412, the output of the large language model, which is a summary of the instructions printed on the form (300), is stored. The output is in the form of natural language text.

At step 438, a data model generation process converts the output of the large language model (i.e., the summary) into the final data model format. In this example, the final data model format is a JSON file, shown in part in FIG. 5A through FIG. 5C. Thus, the summary is converted into a set of key-value pairs where the keys are from instructions and the values are one or more summaries associated with the keys. For example, the large language model may summarize each individual instruction in the form (300), then each summary associated with the corresponding individual instruction. However, the large language model also, or in the alternative, may generate an overall summary of some or all of the natural language instructions in the form (300). In this case, each set of instructions, or the overall set of instructions, may be the one or more keys, and the value for each key may be the summary. The summarized instructions are then added to a JSON file that ultimately becomes the final data model at step 440, below.

Step 438 also may include processing the results of the path B (404) and the path C (406) together with the path A (402) just described. The output generated by the path B (404) and the path C (406) may be processed at step 438 and the processed values added to the final JSON data model generated at step 438.

Thus, attention is turned to path B (404). Just after the text extraction step 400, the method includes step 414. At step 414, key-value pairs of form inputs are extracted from the portion of the text that forms key-value pairs representing inputs to fields on the form. Here, the keys are the fields and the values are ranges of numbers that may be input into a corresponding field. For example, line 6, column B of the form (300) of FIG. 3 may be a key and the corresponding value of the field may be "a number equal to or greater than zero." The column just to the left of line 6, column B on the form (300) of FIG. 3, shown as "00," may be a key, and the corresponding value is defined as "zero zero."

Step 416 then includes converting the key-value pairs defined at step 414 into a data frame. A data frame is a data structure into which information may be stored, possibly together with an application that aids in sorting and organizing the data. In one example, the data frame may be a "pandas" data frame (a type of data frame defined using the python programming language).

At step 418 the data frame of key-value pairs of the form inputs are stored. Once the available key-value pairs of the form inputs are each stored in the data frame, the completed data frame is ready for further processing.

At step 420, data engineering steps may be performed on the data frame stored at step 418. The data engineering steps may include formatting the data frame into a JSON format. For example, the data stored in the data frame may be supplied with brackets, parenthesis, and other symbols used to organize the data in a JSON file. The result of step 420 is a raw text JSON extract of each variable in the form (300).

At step 422, the raw text JSON extract of each variable in the form (e.g., form (300)) is stored. The stored raw text JSON extract is then provided to the data model generation process described at step 438. The stored raw text JSON extract is added to the JSON file that ultimately becomes the final data model at step 440, below.

Attention is now turned to path C (406), which is the method of FIG. 2 as applied to the portion of the text extracted at step 400 that corresponds to the CSV text type. At step 424 the table information CSVs extracted at step 400 are stored. Then, at step 426, the table information CSVs are converted into a data frame. As with step 416 in the path B (404), the data frame may be a "pandas" data frame. The data frame of table information is then stored at step 428.

At step 430 data engineering steps are performed on the data frame stored at step 428. Similar to step 420 on the path B (404), the data engineering steps may include formatting the data frame stored at step 428 into a JSON format. For example, the data stored in the data frame may be supplied with brackets, parenthesis, and other symbols used to organize the data in a JSON file. The result of step 430 is a CSV JSON extract of variables from tables defined in the form (300) of FIG. 3. At step 432, the CSV JSON extract of variables is stored.

In this example, some of the CSV JSON extracts do not have text types assigned to fields on the form (300) of FIG. 3. However, at step 434 the large language model may be provided with a prompt and instructed to identify text types for the fields. Additionally, if a table variable does not have an identified text type, then the prompt (or a second prompt) may instruct the large language model to suggest suggested text types for table variables.

At step 436, the field text types suggested by the large language model are supplied to the CSV JSON file, thereby filling in the text types associated with fields. The modified CSV JSON file then is stored.

Returning to step 438, the modified CSV JSON file is added to the JSON file that ultimately becomes the final data model at step 440, below. Thus, step 438 includes combining the outputs of the path A (402), the path B (404), and the path C (406), described above.

At step 440, the final data model is stored. The final data model is then available for use consumption by tax preparation software applications, or for building tax preparation software applications. In an embodiment, the method of FIG. 4 may terminate thereafter.

FIG. 5A, FIG. 5B, and FIG. 5C together show a portion of the JSON data model that is generated after applying the method of FIG. 4 to the PDF form shown in FIG. 3. Thus, FIG. 5A through FIG. 5C also represent a data model that may be generated as a result of performing the method of FIG. 2. FIG. 5A, FIG. 5B, and FIG. 5C should be viewed together as a whole.

FIG. 5A shows a first portion (500) of the JSON data model. The first portion (500) of the JSON data model includes a summary key-value pair (502). The summary key-value pair (502) includes a summary key (504) represented by the text "FORMINSTRUCTIONS." The value for the summary key-value pair (502) is summary text (506). The summary text (506) represents an output of the large language model that summarizes the various form instructions shown in the form (300) of FIG. 3.

The first portion (500) of the JSON data model also shows other entries stored in a JSON format. For example, a set (508) of key-value pairs identify the organization name, the description of the variable "ORGNAME," a text type of the organization (i.e., "text," as in natural language text), and an indication that a user may enter a valuable for the variable. The set (508) of key-value pairs therefore defines, in a JSON data model format, the "organization name" key (302), and the corresponding allowed values of the field (304) shown in the PDF form of FIG. 3.

Other aspects of the form (300) of FIG. 3 are also shown in the JSON data model shown in the rest of FIG. 5A, as well as in the second portion (510) of the JSON data model shown in FIG. 5B, and the third portion (512) of the JSON data model shown in FIG. 5C. However, the entire JSON data model that defines the form (300) shown in FIG. 3 is sufficiently large that much of the JSON data model key-value entries have been removed from the example of FIG. 5A through FIG. 5C. Thus, while the second portion (510) of the JSON data model shown in FIG. 5B proceeds directly from the first portion (500) of the JSON data model in FIG. 5A, an ellipsis (514) shown in FIG. 5B and another ellipsis (516) shown in FIG. 5C indicates that a gap of key-value information exists between the second portion (510) of the JSON data model in FIG. 5B, and the third portion (512) of the JSON data model in FIG. 5C. However, the final portion (518) of the third portion (512) of the JSON data model in FIG. 5C represents an end of the overall JSON data model generated for the form (300) shown in FIG. 3.

The example shown in FIG. 3 through FIG. 5C does not necessarily limit other embodiments described herein. For example, the method of FIG. 2 may be varied to generate a graph database data model, rather than a JSON file data model, as described with respect to FIG. 2. Thus, one or more embodiments contemplate other variations and examples of the system of FIG. 1, and the method of FIG. 2.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
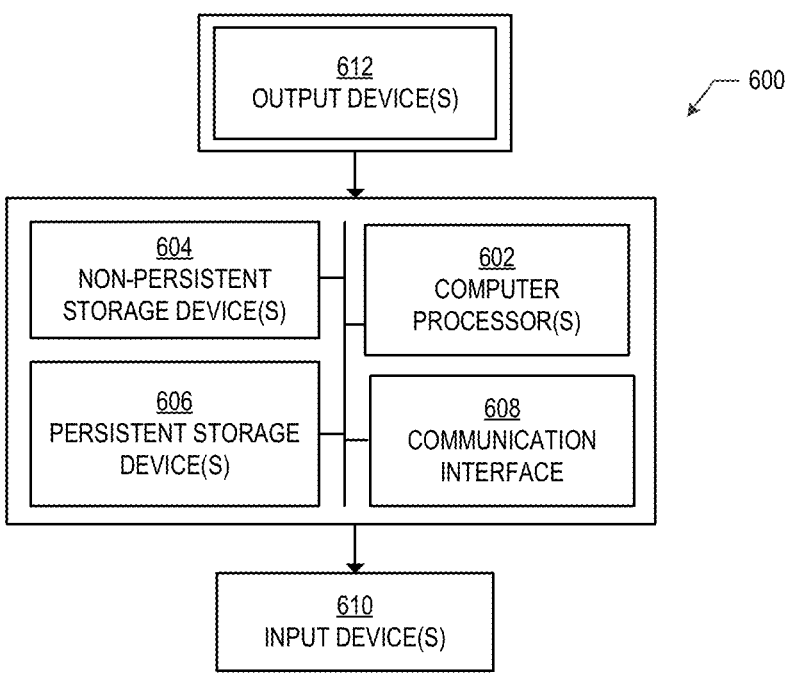
FIG. 6A and FIG. 6B show a computing system and network environment, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores or micro-cores of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input (610) and output device(s) (612) may be locally or remotely connected to the computer processor(s) (602). Many different types of computing systems exist, and the aforementioned input (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions embodied as computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
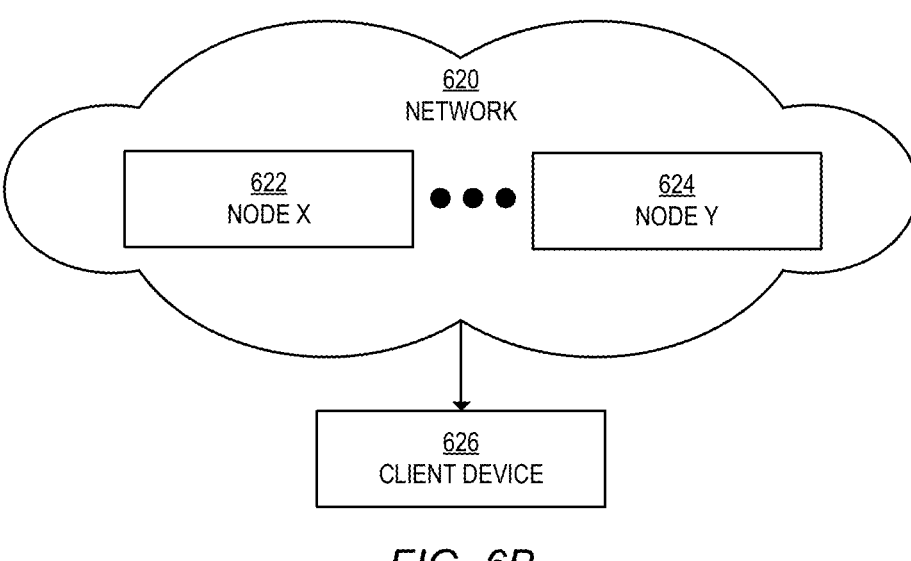

The computing system (600) in FIG. 6A may be connected to or be a part of a network. For example, as shown in FIG. 6B, the network (620) may include multiple nodes (e.g., node X (622), node Y (624)). Each node may correspond to a computing system (600), such as the computing system (600) shown in FIG. 6A, or a group of nodes combined may correspond to the computing system (600) shown in FIG. 6A. By way of an example, embodiments may be implemented on a node of a distributed system that is connected to other nodes. By way of another example, embodiments may be implemented on a distributed computing system (600) having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system (600), such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
processing a raw data structure defining a form comprising text and a table including at least some of the text in a table structure, wherein processing comprises using a data extraction controller to extract the text from the raw data structure, and wherein the raw data structure comprises a computer readable data structure;
determining a text type of the text, wherein the text type comprises a comma separated value (CSV) text type extracted from the table;
converting the CSV text type to a data frame;
formatting the data frame into a structured language data structure;
generating, according to the CSV text type, a prompt for a language model to request enhanced information, wherein the enhanced information comprises text types for individual fields in the form, and further comprises at least a structure of the text, and wherein the prompt further comprises the structured language data structure;
processing, with the prompt, the language model to the text to generate the text types for the individual fields;
adding the text types for the individual fields to the structured language data structure to generate an enhanced structured language data structure;
processing a data model generator on the enhanced structured language data structure and on the table structure to output a data model comprising a computer-readable representation of the form;
building, using the data model, software; and
completing the form automatically using the software.

2. The method of claim 1, wherein:
the form comprises a combination of form text, a field, and a formula, and the text comprises the form text, a summary of the form text, a first definition of the field, and a second definition of the formula.

3. The method of claim 1, wherein the text type further comprises at least one of: instruction text describing instructions on the form, a key-value pair defining a field on the form, and a plurality of comma separated values comprising a definition of a structure of the form, and a combination thereof.

4. The method of claim 1, wherein the enhanced information further comprises at least one of: a summary of form instructions, a rule applied to a key-value pair defining an entry on the form, a substituted text type for a table variable that has an unknown text type, a description of a field of the form, a formula defined by words on the form, and a combination thereof.

5. The method of claim 1, wherein determining the text type comprises identifying the text as further comprising at least one of: plain text, a key-value pair associated with a field of the form, and a table.

6. The method of claim 1, wherein generating the prompt comprises generating an instruction to summarize the text, and wherein the enhanced structured language data structure further comprises a summary of the text that is output by the language model.

7. The method of claim 1, wherein generating the prompt further comprises generating an instruction to define a rule that applies to a key-value pair defining an entry on the form, wherein processing the language model with the prompt further causes the language model to output the rule, and wherein the enhanced structured language data structure further comprises the rule.

8. The method of claim 1, wherein generating the prompt further comprises generating an instruction to identify a table variable, wherein processing the language model with the prompt further causes the language model to output the table variable, and wherein the enhanced structured language data structure further comprises the table variable.

9. The method of claim 1, wherein generating the prompt further comprises generating an instruction to define a rule that applies to a key-value pair, wherein processing the language model with the prompt further causes the language model to output the rule, and wherein the enhanced structured language data structure further comprises the rule.

10. A system comprising:
a processor;
a data repository in communication with the processor and storing:
a raw data structure defining a form comprising text and a table including at least some of the text in a table structure,
text extracted from the raw data structure,
a text type of the text, wherein the text type comprises a comma separated value (CSV) text type extracted from the table,
a data frame,
a structured language data structure,
an enhanced structured language data structure, text types for individual fields in the form,
a prompt comprising instructions to request enhanced information, wherein the enhanced information comprises the text types for individual fields in the form, and further comprises at least the structure of the text, and wherein the prompt further comprises the structured language data structure, and
a data model comprising a computer-readable representation of the form;
a data extraction controller programmed, when executed by the processor, to extract the text from the raw data structure, wherein the raw data structure comprises a computer readable data structure;
a server controller programmed, when executed by the processor to:
generate, according to the CSV text type, the prompt, convert the CSV text type to the data frame,
format the data frame into the structured language data structure,
add the text types for the individual fields to the structured language data structure to generate the enhanced structured language data structure, and
completing the form using software;
a language model programmed at least by the prompt, when executed by the processor, to generate the text types for the individual fields;
a data model generator programmed, when executed by the processor on the enhanced structured language data structure and on the table structure, to output the data model; and
a computer software tool for building, using the data model, the software.

11. The system of claim 10, wherein:
the form comprises a combination of form text, a field, and a formula, and
the text comprises the form text, a summary of the form text, a first definition of the field, and a second definition of the formula.

12. The system of claim 10, wherein the data model generator is further programmed to establish a relationship between at least one of: a first plurality of instances of the text, the text and the enhanced information, or the text and a second plurality of instances of the enhanced information.

13. The system of claim 10, wherein the text type further comprises at least one of: instruction text describing instructions on the form, a key-value pair defining a field on the form, and a plurality of comma separated values comprising a definition of a structure of the form, and a combination thereof.

14. The system of claim 10, wherein the enhanced information further comprises at least one of: a summary of form instructions, a rule applied to a key-value pair defining an entry on the form, a substituted text type for a table variable that has an unknown text type, a description of a field of the form, a formula defined by words on the form, and a combination thereof.

* * * * *